United States Patent Office 3,842,038
Patented Oct. 15, 1974

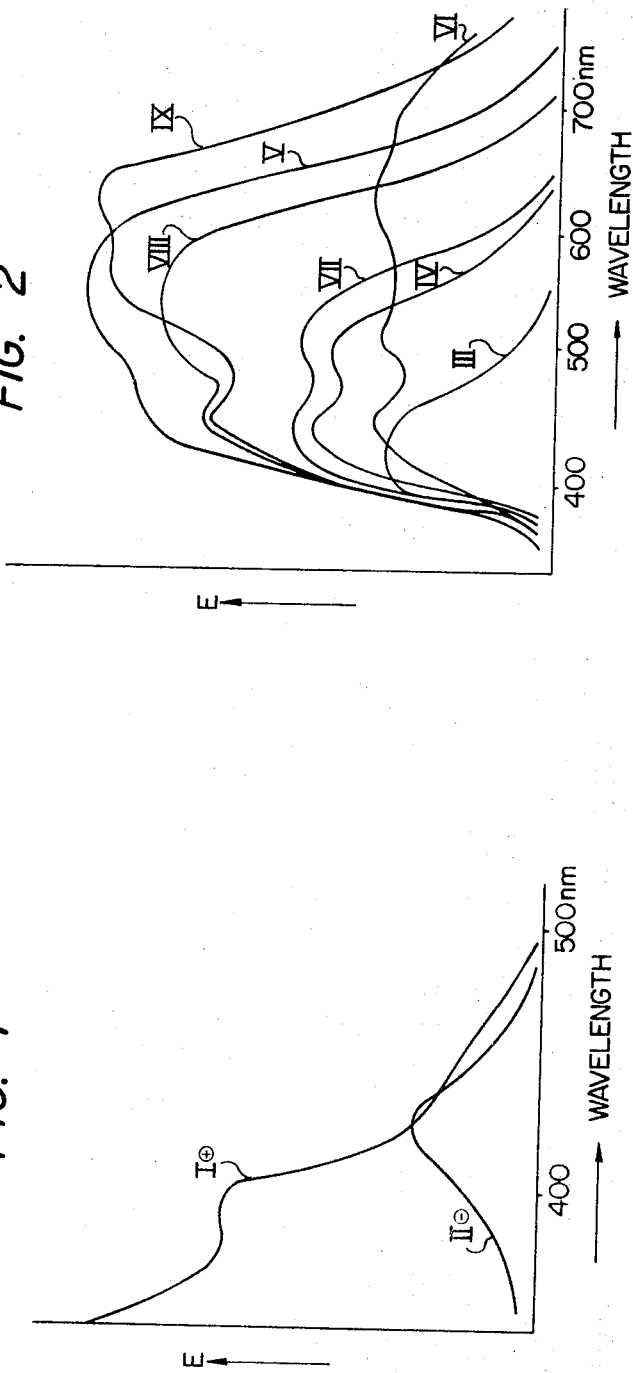

3,842,038
PHOTOCONDUCTIVE POLYMERIC CONDENSATION PRODUCTS OF FORMALDEHYDE WITH A MULTI-NUCLEAR CARBOCYCLIC AROMATIC COMPOUND
Bernd Löhr, Wiesbaden, and Heinz Herrmann, Wiesbaden-Biebrich, Germany, assignors to Kalle Aktiengesellschaft, Wiesbaden-Biebrich, Germany
Filed July 24, 1972, Ser. No. 274,725
Int. Cl. C08g 7/00
U.S. Cl. 260—67 A         10 Claims

ABSTRACT OF THE DISCLOSURE

This invention relates to a photoconductive polymeric condensation product, of formaldehyde or para-formaldehyde and at least one multi-nuclear, carbocyclic aromatic compound, composed of recurrent, noncross-linked units of at least one of the following formulae

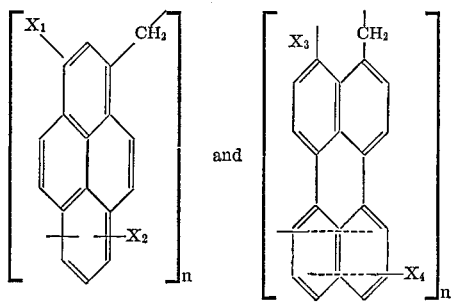

wherein $X_1$ and $X_2$ are selected from the group consisting of hydrogen, alkyl or alkoxy with 1 to 4 carbon atoms, each, or halogen, $X_3$ and $X_4$ are selected from the group consisting of alkyl or alkoxy with 1 to 4 carbon atoms each, or halogen, and $n$ is an integer between about 6 and 10.

said product being soluble in tetrahydrofuran at room temperature.

---

The present invention relates to a photoconductor consisting of a polymeric condensation product of formaldehyde and at least one multi-nuclear carbocyclic aromatic compound which may be substituted, which photoconductor is especially suitable for electrophotographic purposes and is preferably employed in admixture with activators and, if desired, with binders and other additives. Further, the invention relates to a process for the preparation of such photoconductor.

The use of low molecular weight polymeric condensation products of formaldehyde or para-formaldehyde and multi-nuclear carbocyclic and/or heterocyclic aromatic compounds as photoconductors is known (U.S. Pat. No. 3,240,597). It has been found, however, that these condensation products do not satisfy very high requirements as regards their electrophotographic and mechanical properties, such as, light-sensitivity, flexibility and adhesion. This is due, on the one hand, to the aromatic compounds used, such as anthracene, naphthalene, acenaphthene, carbazole and their derivatives, whose photoconductivity is relatively low and cannot be substantially improved by condensation, and, on the other hand, is caused by the method of condensation which yields products having only a low degree of polymerization, because the monomers employed, the same as the polymeric condensation products obtained, are sparingly soluble in the solvent used. Because of the great excess of solvent used for catalyzing the condensation reaction, it is also impossible to control the reaction by maintaining a definite ratio between catalyst and monomer.

Further, high molecular weight condensation products of aldehydes with possibly substituted carbocyclic and/or heterocyclic rings are known as photoconductors (British Pat. No. 1,021,994). It has been found, however, that the photoconductive layers prepared with these compounds do not satisfy very high requirements as to light-sensitivity and chargeability. The condensation products, which are prepared in the presence of acid catalysts, especially concentrated sulfuric acid, contain, attached to the ring or to the methylol end groups formed during the reaction, sulfo groups or acid esters or easily splittable halogen groups whose presence causes substantial drawbacks for the electrophotographic properties, such as, for example, that the conductivity in the dark increases considerably and that the condensation products are no longer capable of being substantially activated. Due to the described method of preparation and the types of aromatic compounds employed, branched or three-dimensionally cross-linked condensation products are formed which do not satisfy the demands made with regard to their solubility and film-forming properties, flexibility and adhesion.

The present invention provides a photoconductor which does not have the above-described disadvantages and has a well-balanced assortment of excellent electrophotographic and mechanical properties comparable to known good photoconductors of different structure, such as polymerized heterocyclic vinyl compounds in admixture with 2,4,7-trinitro-fluorenone (U.S. Pat. No. 3,484,237).

Further, the base materials used for the preparation of the new photoconductor should be inexpensive and easily available, its preparation should be reproducible, and the new photoconductor should be capable of being handled in a suitable solvent without difficulty and without physiological risks.

The problem is solved by a photoconductor, which is especially suitable for electrophotographic purposes, and consists of a polymeric condensation product of formaldehyde or para-formaldehyde and at least one multi-nuclear carbocyclic aromatic compound, which may be substituted, which photoconductor is preferably employed in admixture with activators and possibly also binders and further additives, and consists of recurrent, non cross-linked units of one or both of the following formulae

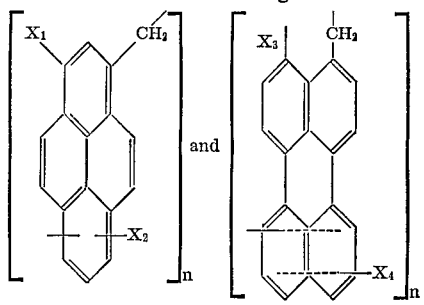

wherein $X_1$ and $X_2$, which may be the same or different, are hydrogen, alkyl or alkoxy with 1 to 4 carbon atoms each, or halogen, preferably chlorine or bromine, $X_3$ and $X_4$, which may be the same or different, are alkyl or alkoxy with 1 to 4 carbon atoms each, or halogen, preferably chlorine or bromine, and $n$ is an integer between about 6 and 10.

and is soluble in tetrahydrofuran at room temperature.

Electrophotographic layers containing the photoconductor according to the invention possess a high degree of flexibility, good adhesion power, high luster, good film-forming properties, good chargeability, and good light-sensitivity. The polymeric condensates according to the invention are readily soluble and the solutions produced may be cast, for example, to form films of high adhesive power and elasticity.

Suitable multi-nuclear carbocyclic aromatic compounds are pyrene and its substitution products, and the derivatives of perylene, which are polycondensed either alone or in admixture with formaldehyde or para-formaldehyde. Among the aromatic compounds of this type, the halogen derivatives of pyrene have proved to be particularly advantageous because of their good solubility characteristics and the relatively higher electrophotographic sensitivity of their polycondensates. The bromine derivatives are more easily available, especially because their preparation is simpler. Of the bromine derivatives, the 3-bromopyrene is preferred because it is less expensive and possesses more favorable solubility characteristics.

Good results are also obtained, particularly when the photoconductor according to the invention is used in combination with special activators, such as 2,4,7-trinitro-fluorenone, by forming a co-condensate with bianthryl. A bianthryl content of about 40 to 60 molar per cent, calculated on the co-condensate, has proved to be advantageous.

Photoconductors which are highly light-sensitive within the ultraviolet range of the spectrum—as shown in Curves I and II of FIG. 1, for positive and negative charging—and which are thus particularly suitable for electrophotographic purposes, are mixed with activators (electron acceptors) such as those known from U.S. Pat. No. 3,287,113, in order to shift their sensitivity towards light of a longer wavelength. Activation of the photoconductors according to the invention within the visible range of the spectrum is of importance, because it enables the reproduction of colors. Layers which have been activated by means of electron acceptors display a particularly high light-sensitivity, and this high degree of light-sensitivity is achieved by adding the activators in a relatively low concentration, which is not the case in layers according to U.S. Pat. No. 3,484,237, for example. While the molar ratio between activator and photoconductor according to the present invention ranges from about 0.01 to about 0.4:1, ratios of about 1:1 are required in this U.S. patent to achieve maximum light-sensitivity. It has proved advantageous to employ 0.1 to about 0.4 mole of activator per mole of photoconductor. Besides their high light-sensitivity, the layers according to the invention—which are used in thicknesses of about 2 to 20μ, preferably of 5 to 15μ—are distinguished by their excellent chargeability, which in the case of negative polarity is in the range of 600 to 1200 volts, depending on the thickness of the layer. This property is of particular advantage because due to the high chargeability, high differences in voltage are achieved during image-wise exposure, such as are required for the production of high contrast images.

Besides their high chargeability, the polymeric condensation products of the invention simultaneously possess a very low conductivity in the dark, which guarantees that the high differences in voltage between light and dark areas produced during image-wise exposure are retained over a relatively long period of time.

The photoconductors according to the present invention permit a sensitization within a definite range of the spectrum. By selecting appropriate activators, the maximum sensitivity may be displaced from the short-wave to the long-wave range of the visible spectrum. Further, a sensitization over the entire range of the spectrum may be achieved by combining different activators. This possibility is less pronounced in the case of known electrophotographic layers. Suitable activators are, e.g.: mono-, di-, tri- and tetranitrofluorenone, 9-dicyanomethylene-fluorene, 9 - dicyanomethylene-mononitro-fluorene, 9-dicyanomethylene-dinitro-fluorene, and 9 - dicyano-methylene-trinitro-fluorene.

Further, binders may be added to the activated photoconductors according to the invention. Those binders are preferred which are soluble in tetrahydrofuran, e.g. polyesters containing terephthalic or isophthalic acid as acid components and various diols as alcoholic components in the chain. Normally, an improvement of the mechanical properties of the layers is achieved by the addition of a binder. The binder content may vary within wide limits without affecting the light-sensitivity of the layers. Particularly in the case of halogen-substituted polycondensates, it may amount to about 200 percent by weight, based on the weight of the photoconductor. The possibility to add to the photoconductor such large quantities of polyester, for example, brings about further advantages over known layers, apart from the large savings in cost. As compared with the layers according to U.S. Pat. No. 3,484,237, for example, the layers according to the invention possess an extreme flexibility and adhesive power, so that they withstand all mechanical stresses which may occur, for example, in a copying machine. In addition to their improved mechanical properties, an improved chargeability and higher light-sensitivity may be achieved. Depending on their binder content, the layers described may be charged to between about 1,400 and 1,800 volts without disruptive discharge. The resistance to disruptive discharge results in a longer service life of the photoconductor layers. In addition to their high resistance to mechanical stress, the layers are distinguished by a particularly smooth surface which, in turn, enables an excellent toner transfer, so that copies of very high contrast are obtained and cleaning of the layer is considerably less expensive.

Further additives which may be incorporated in the described layers and are sometimes advantageous, are: plasticizers, such as dibutyl phthalate; wetting agents, such as silicone oil; dyes, such as cyanine dyes; and/or pigments, such as zinc oxide.

Further, the present invention relates to a process for the preparation of the photoconductor according to the invention from formaldehyde or para-formaldehyde and at least one multi-nuclear carbocyclic aromatic compound which may be substituted, by introduction of the components into a solvent, condensation in the presence of a condensation catalyst at temperatures between 80 and 100° C., precipitation of the polycondensate, suction, purification and drying. In the process, the solvent used is dioxane and perchloric acid is used as the condensation catalyst; the polycondensate is precipitated from a mixture of tetrahydrofuran and a lower aliphatic alcohol, preferably methanol.

In a modification of the inventive process for the preparation of the photoconductor, the solvent used is glacial acetic acid and anhydrous zinc chloride is used as the condensation catalyst.

The processes according to the present invention avoid the above-described disadvantages and in the case of the multinuclear carbocyclic, possibly substituted, aromatic derivatives of pyrene and perylene under consideration lead to polycondensates having excellent mechanical and photoconductive properties, since no further reaction of the components with the catalysts used or incorporation of the catalysts takes place.

The selection of dioxane as the solvent guarantees not only the solubility of compounds of a relatively high degree of condensation, but also the good catalytic effect of perchloric acid. When using glacial acetic as the solvent, a transgression of a degree of polycondensation unfavorable for the solubility in tetrahydrofuran may be avoided by the relatively limited solubility of the polycondensates formed. Moreover, this solvent is best suited for guaranteeing the optimum catalytic effect of the catalyst used, because it substantially prevents hydrolysis, i.e. the formation of hydrochloric acid, which may cause undesired reactions.

In principle, both processes may be employed for the aromatic compounds mentioned. Which process is selected depends on the solubility and the reactivity of the aromatic compounds to be condensed. In the case of an aromatic compound which is sparingly soluble, condensation in dioxane has proved to be preferable, because normally dioxane has a better dissolving power. When the aromatic compound concerned is readily soluble in dioxane and highly reactive, the condensation reaction may be more easily controlled when glacial acetic acid is used as the solvent. Further, it is possible in both processes to control the reaction process not only by the ratio of aldehyde and aromatic compound employed, but also by the quantity of catalyst added, a fact which is of particular importance for the production of chains of a desired length.

The weight ratio between aromatic compound and condensation catalyst may vary within wide limits. During the condensation of pyrene, for example, a ratio between the aromatic compound and the zinc chloride used as a catalyst of about (5 to 8):1 has proved advantageous, however, whereas during the condensation of bromopyrene, for example, a ratio of about (8 to 11):1 is suitable. When perchloric acid is used as the catalyst in the condensation process, ratios between aromatic compound and catalyst of (20 to 25):1 for pyrene and its derivatives and of (4 to 6):1 for condensates based on perylene are suitable. Similar ratios apply to co-condensates.

The preparation of the photoconductors according to the invention will be described more in detail in the following examples:

EXAMPLE 1

100 g. of 3-chloropyrene are introduced into 750 ml. of dioxane and the mixture is maintained at a temperature of 95° C. The solution is then mixed with 1 to 2 ml. of perchloric acid. Finally, 12.6 g. of para-formaldehyde are added while stirring. The condensation is interrupted after 4 hours, the solution is allowed to cool, and is then added dropwise to 6 liters of methanol. The polycondensate which precipitates in the form of fine flakes is filtered, washed with methanol, and dried. After drying, the polycondensate is dissolved in 150 ml. of tetrahydrofuran, filtered, and reprecipitated by introducing the solution dropwise into methanol. This purification process is repeated. After drying, a colorless product is obtained which softens in the range of 135 to 140° C. and which has a degree of polycondensation between 7 and 10 when measured by the chromatographic gel permeation method, using low molecular weight polystyrene for comparison (Yield: 75 to 80%).

EXAMPLE 2

12 g. of dichloroperylene are dissolved at 90-95° C. in 300 ml. of dioxane. The first 1 to 2 ml. of perchloric acid and then 1.2 g. of para-formaldehyde are added to the solution. The condensation process lasts 3 hours. The formulation is then processed in the manner described above. Yield: 60 to 65%. Softening range: 130-135° C. Degree of polycondensation: 8 to 10.

EXAMPLE 3

40 g. of pyrene are dissolved together with 6.5 g. of paraformaldehyde at 90-100° C. in 250 ml. of glacial acetic acid. After this temperature has been reached, 5.0 g. of anhydrous zinc chloride are added and the formulation is then stirred for 5 hours at constant temperature. The precipitating polycondensate is drawn off by suction, washed first with water and then with methanol, and finally dried. For purification, the polycondensate is dissolved in about 300 ml. of tetrahydrofuran, filtered, introduced into about 2 liters of methanol, and re-precipitated. This purification process is repeated. A colorless product is thus obtained in a yield of 80 to 85%. The softening range is from about 155 to 165° C. The degree of polycondensation, measured by the method cited in Example 1, is about 6 to 8.

EXAMPLE 4

40 g. of 3-bromopyrene are dissolved, together with 4.5 g. of para-formaldehyde, in 400 ml. of glacial acetic acid at 95-100° C., 2 g. of anydrous $ZnCl_2$ are added and the formulation is further stirred for 3 to 4 hours. The precipitating polycondensate is drawn off by suction, washed with water and ethanol, dried, and then purified as described above. A colorless powder results which has a softening range of 130-140° C. and a degree of polycondensation between 6 and 8. Yield: 90-95%.

EXAMPLE 5

30 g. of bianthryl and 50 g. of 3-bromopyrene are dissolved together with 2 ml. of perchloric acid in 1500 ml. of dioxane at a temperature of 90-95° C. Then 7.9 g. of para-formaldehyde are added to the clear solution. After 1 hour, the condensation process is interrupted by pouring the solution into 8 liters of methanol. Processing and purification are as in Example 1.

A yellowish product is obtained in a yield of 50-60%, which has a softening range of about 170 to 180° C.

The properties of the photoconductors according to the invention will be described in the following by reference to their use in electrophotographic layers. The data measured will be compared with the corresponding data of known layers prepared according to Example 2 of U.S. Pat. No. 3,240,597 (here: Example A), Example 15 of British Pat. No. 1,021,994, (here: Example B), and Example 1 of U.S. Pat. No. 3,484,237, (here: Example C).

EXAMPLE 6

2 g. of pyrene resin with a softening range of 160-165° C., 0.56 g. of trinitrofluorenone (molar ratio between activator and monomer unit 0.19), and 1.2 g. of polyester ("Dynapol"® L 203, a product of Dynamit Nobel AG, Troisdorf, Germany) are dissolved at room temperature in 25 ml. of tetrahydrofuran and drawn off from the undissolved residue by suction. The solution is whirler-coated onto a rotating conductive support consisting of polyester with a vapor-deposited aluminum layer thereon.

The light-sensitive layer thus produced is dried for 3 to 4 minutes at 110° C. in a drying cabinet to remove the solvent. A reddish-brown layer results. The layer is negatively or positively charged under a corona, then image-wise exposed, and developed in the normal manner. An image is thus produced which is rich in contrast and shows no scumming. The electrophotographic properties were determined by means of the "Dyntest-90" apparatus manufactured by ECE Gmbh, Giessen, Germany. This apparatus serves to determine charge, dark discharge, and light discharge. The half-time is used as a measure of the sensitivity. "Half-time" is the time in which the voltage is reduced to half its original value at a particular exposure.

The characteristic data are as follows:

Charge:
  \+ ------------------------------volts-- 1200
  \- ------------------------------do---- 1500
Half-time:
  \+ ------------------------------msec-- 35
  \- ------------------------------msec-- 32

The above-mentioned comparison layers produce the following data:

|   | Charge (volts) | | Half-time (msec.) | |
| --- | --- | --- | --- | --- |
|   | + | − | + | − |
| A | 480 | 650 | 100 | [1] 75 |
| B | 450 | 600 | 80 | [2] 75 |
| C | 600 | 1,100 | 50 | [3] 28 |

[1] High residual voltage.
[2] Considerable dark discharge.
[3] Considerable dark discharge with positive charge.

EXAMPLE 7

2 g. of 3-bromopyrene resin and 0.56 g. of trinitrofluorenone are dissolved, together with 1 g. of a polyester ("Dynapol"® L 206, a product of Dynamit Nobel AG, Troisdorf, Germany) in 25 ml. of tetrahydrofuran at room temperature and then applied as described in Example 1 to polyester provided with a vapor-deposited aluminum layer.

The following values result:

Charge:
+ ----volts-- 1250
− ----do---- 1600

Half-time:
+ ----msec-- 32
− ----msec-- [1] 28

[1] Very little dark discharge.

EXAMPLE 8

2 g. of 3-bromopyrene resin and 0.22 g. of dicyanomethylene-2,7-dinitrofluorene are dissolved, together with 1 g. of polyester, in 25 ml. of tetrahydrofuran, and the solution is filtered and cast as a film onto a rotating conductive support consisting of polyester with a vapor-deposited aluminum layer thereon. The resulting light-sensitive layer shows the following values:

Charge:
+ ----volts-- 1250
− ----do---- 1400

Half-time:
+ ----msec-- 15
− ----msec-- 10

EXAMPLE 9

2 g. of 3-bromopyrene resin, 0.25 g. of dicyanomethylene-2,4,7-trinitrofluorene, and 1 g. of polyester are dissolved in 25 ml. of tetrahydrofuran and applied as a thin film to a conductive support as described in the preceding examples. Upon examination of the film, the following values are measured:

Charge:
+ ----volts-- 1100
− ----do---- 1300

Half-time:
+ ----msec-- 15
− ----msec-- 10

EXAMPLE 10

2 g. of 3-bromopyrene resin, 0.1 g. of tetranitro-pyrene, and 1 g. of polyester are dissolved in 25 ml. of tetrahydrofuran, applied as a thin film to a conductive support as described in the preceding examples, and examined. The following values are measured:

Charge:
+ ----volts-- 1075
− ----do---- 1100

Half-time:
+ ----msec-- 21.6
− ----msec-- 18.0

EXAMPLE 11

2 g. of 3-bromopyrene resin, 0.2 g. of trinitro-bromopyrene, and 1 g. of polyester are processed, in the manner described above, to yield a photoconductive layer. The following values are measured:

Charge:
+ ----volts-- 975
− ----do---- 1025

Half-time:
+ ----msec-- 32.5
− ----msec-- 21.0

EXAMPLE 12

2 g. of 3-bromopyrene resin are activated with 0.5 g. of trinitrofluoroanthene and then processed together with 1 g. of polyester in known manner to yield a photoconductor layer.

Charge:
+ ----volts-- 1025
− ----do---- 1150

Half-time:
+ ----msec-- 37.5
− ----msec-- 28.0

EXAMPLE 13

2 g. of 3-bromopyrene resin, 0.3 g. of tetranitro-perylene, and 1 g. of polyester are processed in the same manner to yield a photoconductor layer.

Charge:
+ ----volts-- 875
− ----do---- 975

Half-time:
+ ----msec-- 21.5
− ----msec-- 20.0

EXAMPLE 14

1 g. of dichloroperylene resin and 0.14 g. of trinitrofluorenone are dissolved together with 1.5 g. of polyester in 25 ml. of tetrahydrofuran and used in the manner described for the preparation of a photoconductive layer.

Charge:
+ ----volts-- 1100
− ----do---- 1300

Half-time:
+ ----msec-- 30
− ----msec-- 20

EXAMPLE 15

2 g. of a formaldehyde condensate of bianthryl and 3-bromopyrene having a bianthryl content of 57.7 mole percent are applied, together with 0.56 g. of trinitrofluorenone and 1 g. of polyester, in known manner as a thin film from a tetrahydrofuran solution to a conductive support.

Results:
Charge:
+ ----volts-- 1000
− ----do---- 1200

Half-time:
+ ----msec-- 35
− ----msec-- 30

EXAMPLE 16

2 g. of isopropyl-pyrene resin, 0.5 g. of trinitrofluorenone and 0.5 g. of polyester are dissolved in 25 ml. of tetrahydrofuran. The solution is filtered and then cast as a film onto a rotating conductive support. The layer is dried for 3 to 4 minutes at 110° C. in a drying cabinet to remove residual solvent. Subsequently, the layer is negatively charged by a corona, image-wise exposed, and developed in the normal manner. The toner image is transferred onto paper and fixed by heating it for 20 seconds. An image is thus obtained which is rich in contrast and free from scumming.

EXAMPLE 17

The procedure described in Example 16 is repeated, except that the isopropyl-pyrene is replaced by t-butyl pyrene resin or di-t-butyl-pyrene resin, good results being also obtained in this case.

EXAMPLE 18

2 g. of methoxy-pyrene resin, 0.45 g. of trinitrofluorenone, and 1 g. of polyester are dissolved at room temperature in tetrahydrofuran and processed as described into a photoconductive layer on a conductive support. After transfer and fixation, images with sharp contrast are obtained. Results of similar quality are produced when the methoxy-pyrene resin is replaced by dimethoxy-pyrene resin.

EXAMPLE 19

The position of the maximum sensitivity may be displaced by using different activators. In the following schedule, the maxima are listed for 3-bromopyrene resin layers mixed with different acceptors. In all cases, the ratio between monomer unit and activator is 1:0.1, this ratio being selected to facilitate comparison, without assuming that it effects optimum activation in each case.

| Number | Activator | Maximum sensitivity (nm.) |
|--------|-----------|---------------------------|
| III | 2-nitrofluorenone | 400–480 |
| IV | 2,7-dinitrofluorenone | 420–550 |
| V | 2,4,7-trinitrofluorenone | 420–640 |
| VI | 2,4,5,7-tetranitrofluorenone | 420–750 |
| VII | 9-dicyanomethylenefluorene | 420–475 |
| VIII | 9-dicyanomethylene-2-nitrofluorene | 420–625 |
| IX | 9-dicyanomethylene-2,7-dinitrofluorene | 420–700 |

In addition, the distribution of the spectral sensitivities of the activated layers is indicated in the accompanying FIG. 2, the senstivities being shown as reciprocal half-times negatively charged layers.

The attached FIGS. 1 and 2 differ in scale. In FIG. 2, the ordinate was reduced by a factor of about 4.

It will be obvious to those skilled in the art that many modifications may be made within the scope of the present invention without departing from the spirit thereof, and the invention includes all such modfications.

What is claimed is:

1. A photoconductive polymer condensation product, of formaldehyde or para-formaldehyde and at least one multi-nuclear, carbocyclic aromatic compound, composed of recurrent, non cross-linked units of at least one of the following formulae

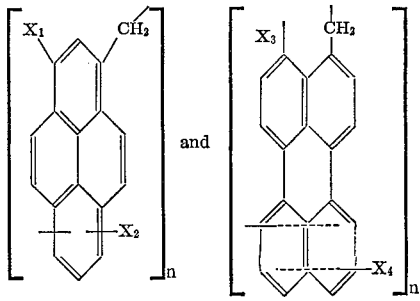

wherein
$X_1$ and $X_2$ are selected from the group consisting of hydrogen, alkyl or alkoxy with 1 to 4 carbon atoms each, or halogen,
$X_3$ and $X_4$ are selected from the group consisting of alkyl or alkoxy with 1 to 4 carbon atoms each, or halogen, and
$n$ is an integer between about 6 and 10,
said product being soluble in tetrahydrofuran at room temperature.

2. A product according to claim 1 containing dichloroperylene as the multi-nuclear carbocyclic aromatic compound.

3. A product according to claim 1 containing additional co-condensed bianthryl units.

4. A photoconductive polymer condensation product, of formaldehyde or paraformaldehyde and at least one multi-nuclear, carbocyclic aromatic compound, composed of recurrent, non-cross-linked units of the following formula

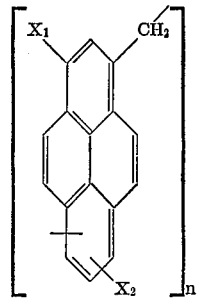

wherein $X_1$ and $X_2$ are selected from the group consisting of
(1) hydrogen or alkyl with 1 to 4 carbon atoms,
(2) alkoxy with 1 to 4 carbon atoms, or
(3) halogen, and
$n$ is an integer between about 6 and 10,
said product being soluble in tetrahydrofuran at room temperature.

5. A product according to claim 4 containing 3-bromopyrene as the multi-nuclear carbocyclic aromatic compound.

6. A product according to claim 4 containing 3-chloropyrene as the multi-nuclear carbocyclic aromatic compound.

7. A product according to claim 4 containing isopropylpyrene as the multi-nuclear carbocyclic aromatic compound.

8. A product according to claim 4 in which the halogen is chlorine or bromine.

9. A process for the preparation of a photoconductor which comprises introducing formaldehyde or paraformaldehyde and at least one multi-nuclear, carbocyclic aromatic compound into a compound selected from the group consisting of dioxane and glacial acetic acid, condensing said reactants at a temperature between 80 and 100° C. in the presence of a compound selected from the group consisting of perchloric acid and anhydrous zinc chloride as a condensation catalyst, precipitating a polycondensate in a mixture of tetrahydrofuran and a lower aliphatic alcohol, and recovering said polycondensate as a product of the process.

10. A process according to claim 9 in which said lower aliphatic alcohol is methanol.

References Cited
UNITED STATES PATENTS
3,740,218    6/1973    Contois et al. _____ 260—67 A LUCILLE M. PHYNES, Primary Examiner U.S. Cl. X.R.
96—1.5; 252—501

UNITED STATES PATENT OFFICE
CERTIFICATE OF CORRECTION

Patent No. 3,842,038                     Dated October 15, 1974

Inventor(s) Bernd Löhn and Heinz Herrmann

It is certified that error appears in the above-identified patent and that said Letters Patent are hereby corrected as shown below:

Column 1, after line 9, the following should be inserted - - - Claims priority, application Germany, July 26, 1971, P 21 37 288.3 - - .

Column 8, line 68, after "isopropyl-pyrene" the word - - - resin - - - should be inserted.

Column 9, line 21, "420-475" should read - - - 420-575 - - -. Line 27, after "times", the word - - - of - - - should be inserted.

Signed and sealed this 10th day of December 1974.

(SEAL)
Attest:

McCOY M. GIBSON JR.                      C. MARSHALL DANN
Attesting Officer                        Commissioner of Patents